United States Patent
Feng

(10) Patent No.: US 8,085,503 B2
(45) Date of Patent: Dec. 27, 2011

(54) SUSPENSION HAVING AN ISOLATED TRAILLING PORTION, HEAD GIMBAL ASSEMBLY AND DISK DRIVE UNIT WITH THE SAME

(75) Inventor: XianWen Feng, Dongguan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 345 days.

(21) Appl. No.: 12/385,675

(22) Filed: Apr. 15, 2009

(65) Prior Publication Data

US 2010/0265621 A1    Oct. 21, 2010

(51) Int. Cl.
*G11B 5/60*    (2006.01)
(52) U.S. Cl. .............. 360/234.6; 360/234.5; 360/245.3
(58) Field of Classification Search .......... 360/245.3, 360/234.5, 234.6
See application file for complete search history.

(56) References Cited

U.S. PATENT DOCUMENTS

| | | | |
|---|---|---|---|
| H1424 H * | 4/1995 | Budde | 360/245.5 |
| 7,468,869 B2 * | 12/2008 | Yao et al. | 360/294.4 |
| 2002/0141117 A1 * | 10/2002 | Kasajima et al. | 360/294.4 |
| 2007/0253115 A1 * | 11/2007 | Yao et al. | 360/294.4 |
| 2008/0170326 A1 * | 7/2008 | Feng et al. | 360/99.04 |
| 2008/0266714 A1 * | 10/2008 | Feng et al. | 360/234.6 |
| 2009/0073611 A1 * | 3/2009 | Wei et al. | 360/234.6 |

* cited by examiner

*Primary Examiner* — Hoai V Ho
*Assistant Examiner* — Jay Radke
(74) *Attorney, Agent, or Firm* — Nixon & Vanderhye PC

(57) ABSTRACT

A suspension for a head gimbal assembly comprises a flexure having a suspension tongue with a trailing portion. The trailing portion has a plurality of trailing pads formed thereon adapted for bonding to a trailing edge of a slider. The trailing portion is isolated from other portions of the flexure by a first slot surrounding the trailing portion. The isolated trailing portion is not affected due to the temperature change, the thermal crown change of the slider is reduced and, in turn, the variation of flying height of the slider is reduce so as to improve read/write performance of the slider. The invention also discloses a head gimbal assembly and a disk drive unit with the same.

17 Claims, 7 Drawing Sheets

SUSPENSION HAVING AN ISOLATED TRAILLING PORTION, HEAD GIMBAL ASSEMBLY AND DISK DRIVE UNIT WITH THE SAME

FIELD OF THE INVENTION

The present invention relates to information recording disk drive devices, and more particularly to a suspension having an isolated training portion bonded to a slider, head gimbal assembly and disk drive unit with the same.

BACKGROUND OF THE INVENTION

Disk drive devices are common information storage devices. FIG. 1a illustrates a conventional disk drive device and shows a magnetic disk 101 mounted on a spindle motor 102 for spinning the disk 101. A voice coil motor arm 104 carries a head gimbal assembly (HGA) 100 that includes a slider 103 incorporating a read/write transducer. A voice-coil motor (VCM, not labeled) is provided for controlling the motion of the motor arm 104 and, in turn, controlling the slider 103 to move from track to track across the surface of the disk 101, thereby enabling the read/write head to read data from or write data to the disk 101.

Now referring to FIG. 1b, the HGA 100 comprises a slider 103 having a reading/writing transducer imbedded therein, a suspension 190 to load or suspend the slider 103 thereon. As illustrated, the suspension 190 includes a load beam 106, a base plate 108, a hinge 107 and a flexure 105, all of which are assembled together.

In operation, a lift force is generated by the aerodynamic interaction between the slider 103 incorporating the read/write transducer and the spinning magnetic disk 101. The lift force is opposed by equal and opposite spring forces applied by the HGA 100 such that a predetermined flying height above the surface of the spinning disk 101 is maintained over a full radial stroke of the motor arm 104. A mounting hole 110 also is shown.

In a common disk drive unit, the slider flies only approximately a few micro-inches above the surface of the rotating disk. Generally, the flying height of the slider is considered as one of the most critical parameters affecting the disk reading and writing performances. More concretely, a relatively small flying height allows the transducers embedded in the slider to achieve a greater reading/writing resolution between different data bit locations on the disk surface, thus improving data storage capacity of the disk. Therefore, it is desired that the slider have a very small flying height to achieve a higher data storage capacity. At the same time, with the increasing popularity of lightweight and compact notebook type computers that utilize relatively small yet powerful disk drives, the need for a progressively lower and lower flying height has continually grown.

With reduction of the flying height, it is strongly expected that the flying height be kept constant all the time regardless of variable flying conditions, since great variation of flying height will deteriorate reading/writing performance of the slider, and in worse cases even result in data reading/writing failure. One of the facts that cause variation of flying height is thermal deformation of the suspension tongue. Specifically, when subjected to strong temperature changes, the suspension tongue will expand or contract, thus making the profile of the slider mounted thereon also deformed, and finally resulting in variation of the flying height. The flying height variation further badly affects the reading/writing performance of the slider. Therefore, it is necessary to control the deformation to a tolerant limit.

FIG. 1c is a partial top plan view of a typical flexure of the HGA shown in FIG. 1b, showing a structure of a suspension tongue of the flexure. As shown in FIG. 1c, several slots 128, 131, 133 with different shapes are formed in the suspension tongue 116 of the flexure 105 for releasing thermal deformation of the suspension tongue 116.

However, the structure of the suspension 190 described above is still sensitive to the thermal affect and apt to result in great variation of flying height of the slider, and also leads to high shock stresses at the bonding pads 126 and grounding pads 125.

Thus, there is a need for an improved suspension, head gimbal assembly, and disk drive unit that do not suffer from the above-mentioned drawbacks.

SUMMARY OF THE INVENTION

One aspect of the present invention is to provide a suspension for a head gimbal assembly that can reduce variation of flying height of a slider to improve flying performance thereof and yield lower shock stresses at the grounding pads and the bonding pads.

Another aspect of the present invention is to provide a head gimbal assembly that can reduce variation of flying height of a slider to improve flying performance thereof and improve the shock performance thereof.

Still another aspect of the present invention is to provide a disk drive unit that can reduce variation of flying height of a slider to improve flying performance thereof and improve the shock performance thereof.

To achieve the above-mentioned objectives, a suspension for a head gimbal assembly comprises a flexure having a suspension tongue with a trailing portion, which is isolated from other portions of the flexure by a first slot surrounding the trailing portion. The trailing portion has a plurality of trailing pads formed thereon adapted for bonding to a trailing edge of a slider.

In an embodiment of the suspension according to the present invention, the suspension tongue further comprises a leading portion with a pair of leading pads formed thereon adapted for bonding to a leading edge of the slider, and a pair of leading pad notches semi-surrounding the corresponding leading pads respectively.

Preferably, the leading pad notch is F-shaped, each of the leading pads is located at the position between the two transverse ends of the corresponding F-shaped leading pad notch.

Preferably, the pair of leading pad notches are symmetrical about a longitudinal centerline of the suspension tongue.

In another embodiment of the suspension according to the present invention, the suspension tongue further comprises a C-shaped slot formed adjacent to the leading pad notches and between the first slot and the leading pads notches.

Preferably, the suspension tongue further comprises a closed slot formed adjacent to the first slot, and a pair of one-end-opened slots opened from the perimeter of the suspension tongue. The pair of one-end-opened slots are formed between the C-shaped slot and the closed slot adjacent to the first slot and symmetrical about the longitudinal centerline of the suspension tongue.

A head gimbal assembly comprises a slider and a suspension supporting the slider. The suspension comprises a flexure having a suspension tongue with a trailing portion. The trailing portion having a plurality of trailing pads formed thereon, and the trailing portion is isolated from other portions of the flexure. The slider has a trailing edge bonded to the trailing pads.

A disk drive unit comprises a head gimbal assembly including a slider and a suspension that supports the slider, a drive arm connected to the head gimbal assembly, a disk, and a spindle motor operable to spin the disk. The suspension comprises a flexure having a suspension tongue with a trailing portion. The trailing portion having a plurality of trailing pads formed thereon, and the trailing portion is isolated from other portions of the flexure. The slider has a trailing edge bonded to the trailing pads.

Compared with the flexure of the conventional suspension, because the trailing portion is isolated from other portions of the flexure, the expansion and contraction of the suspension tongue caused by strong temperature changes will have less impact on the trailing portion, thus it can reduce the thermal crown change of the slider and, in turn, reduce the variation of flying height of a slider to improve flying performance of the slider. Furthermore, it yields lower shock stresses at the trailing pads and the leading pads, so the shock performance is also improved. In addition, with the introduction of other slots formed on the suspension tongue, the thermal crown change of the slider under different temperature can be further reduced so that the flying performance of the slider can be improved.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a perspective view of a HGA of the disk drive unit shown in FIG. 1a;

FIG. 2b is a partial top plan view of the suspension tongue of the suspension shown in FIG. 2a;

DETAILED DESCRIPTION OF ILLUSTRATED EMBODIMENTS

Figure 1A:
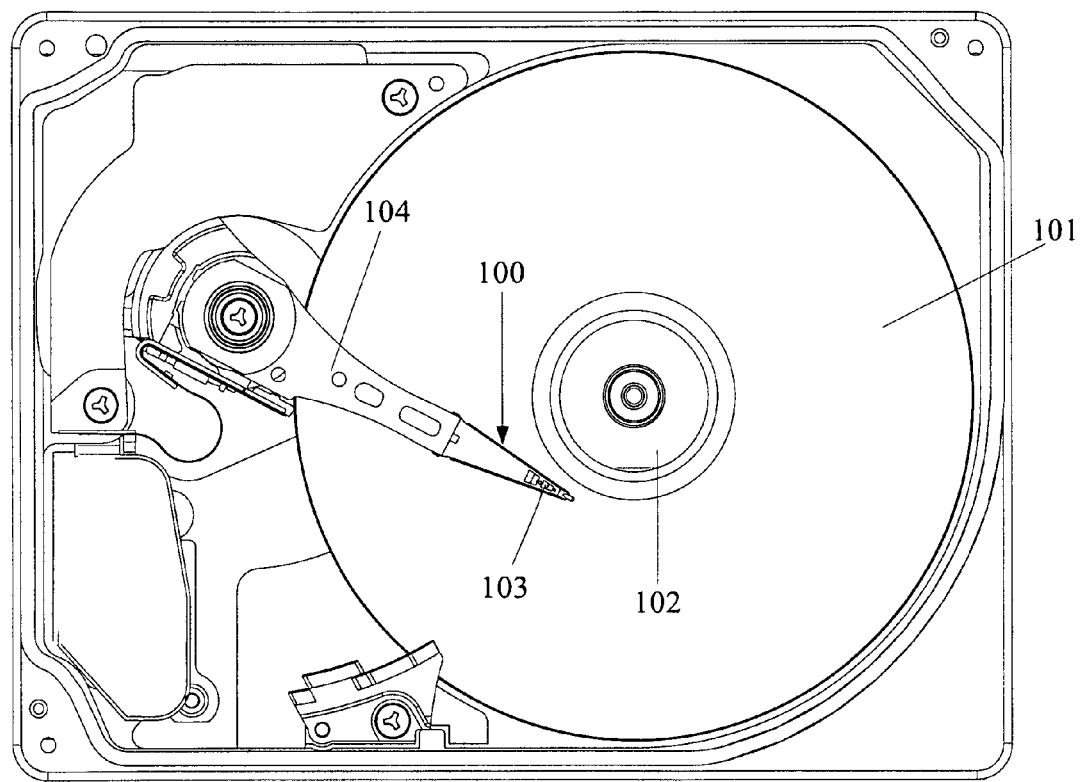
FIG. 1a is a perspective view of a conventional disk drive unit.
Figure 1B:
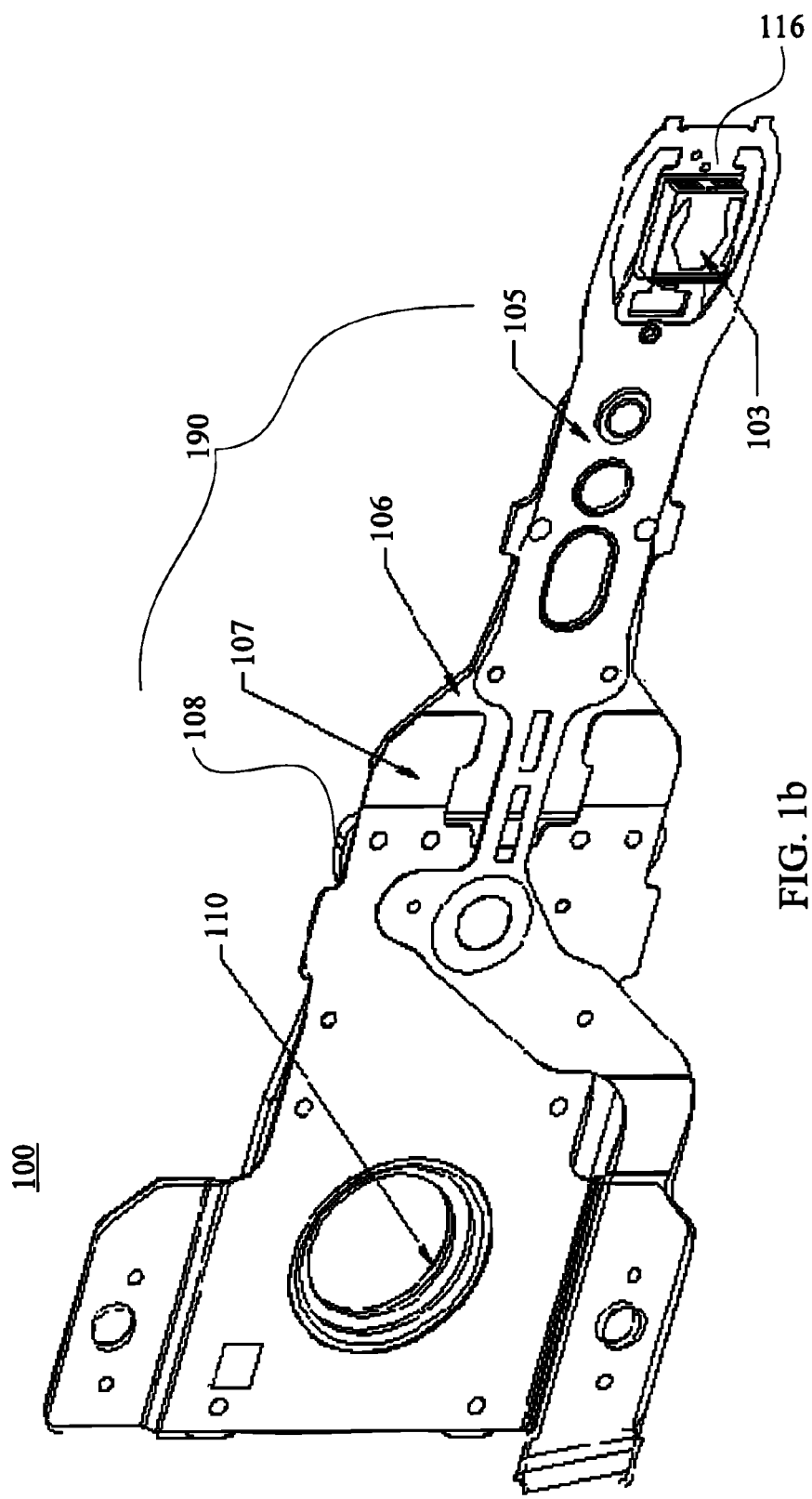
Figure 1C:
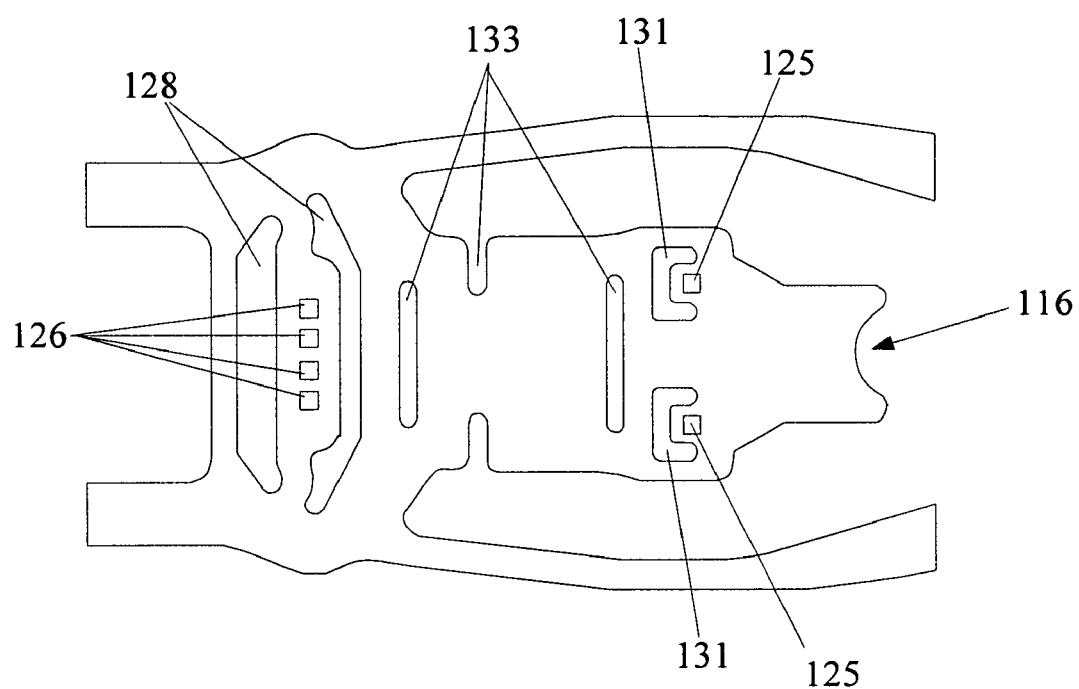
FIG. 1c is a partial top plan view of the suspension of the HGA shown in FIG. 1b.

Various preferred embodiments of the invention will now be described with reference to the figures, wherein like reference numerals designate similar parts throughout the various views. As indicated above, the invention is directed to a suspension for a head gimbal assembly that includes a flexure having a suspension tongue with a trailing portion, which is isolated from other portions of the flexure by a first slot surrounding the trailing portion. This structure can reduce variation of flying height of a slider to improve flying performance thereof and yield lower shock stresses at the grounding pads and the bonding pads.

Figure 2A:
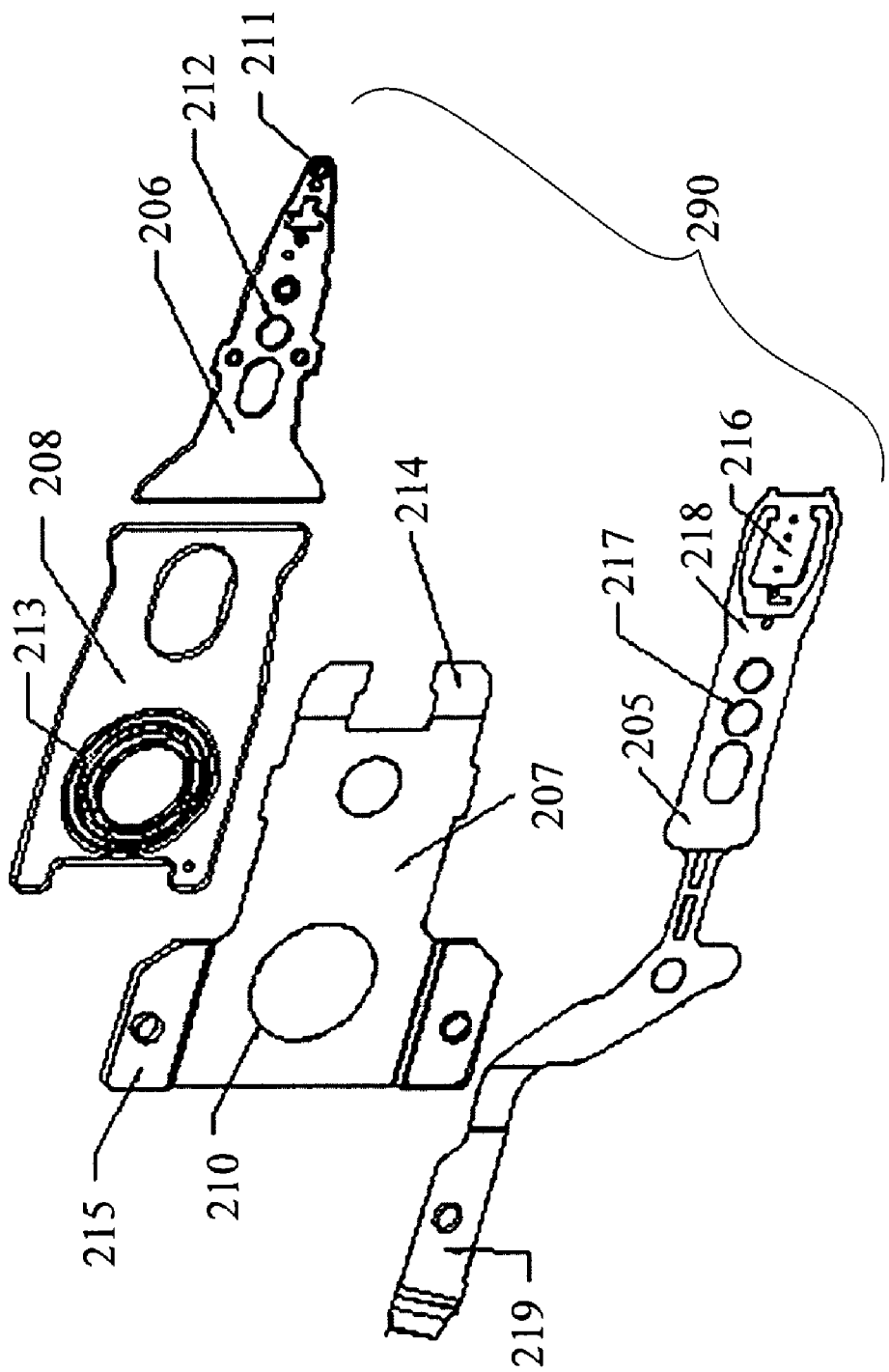
FIG. 2a is an exploded perspective view of a suspension according to an embodiment of the present invention.
Figure 2B:
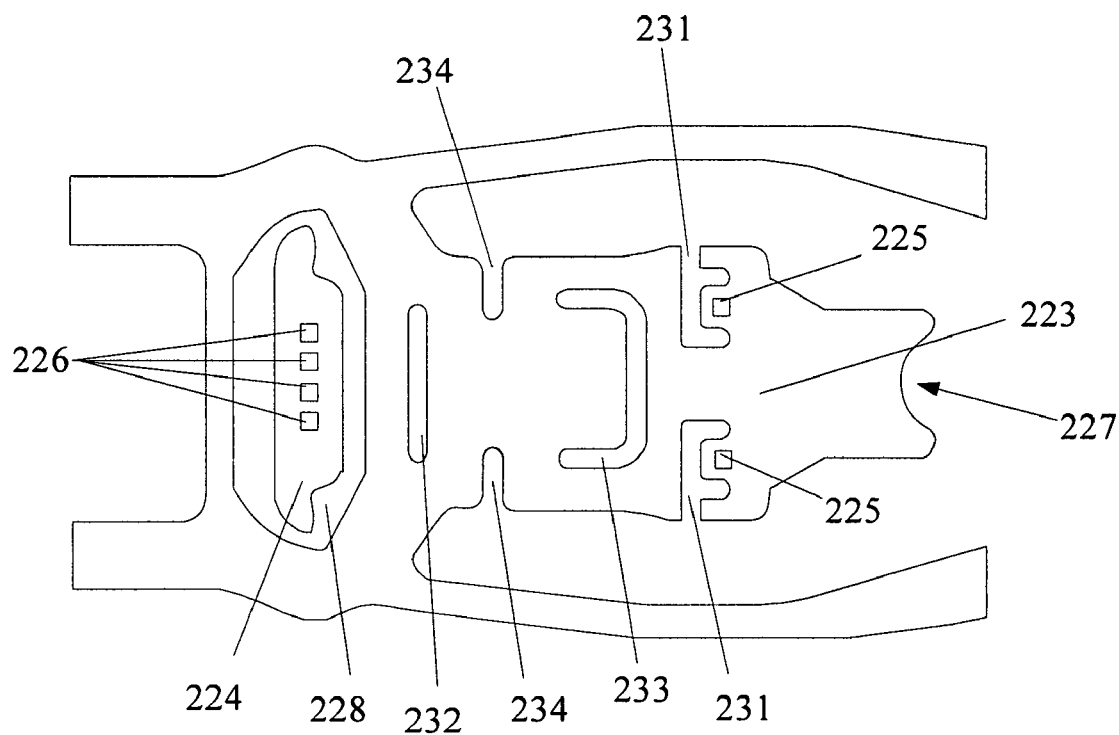

FIGS. 2a-2b show an embodiment of the suspension of the present invention. As illustrated in FIG. 2a, the suspension 290 comprises a load beam 206, a base plate 208, a hinge 207 and a flexure 205, all of which are assembled with each other.

Figure 3:
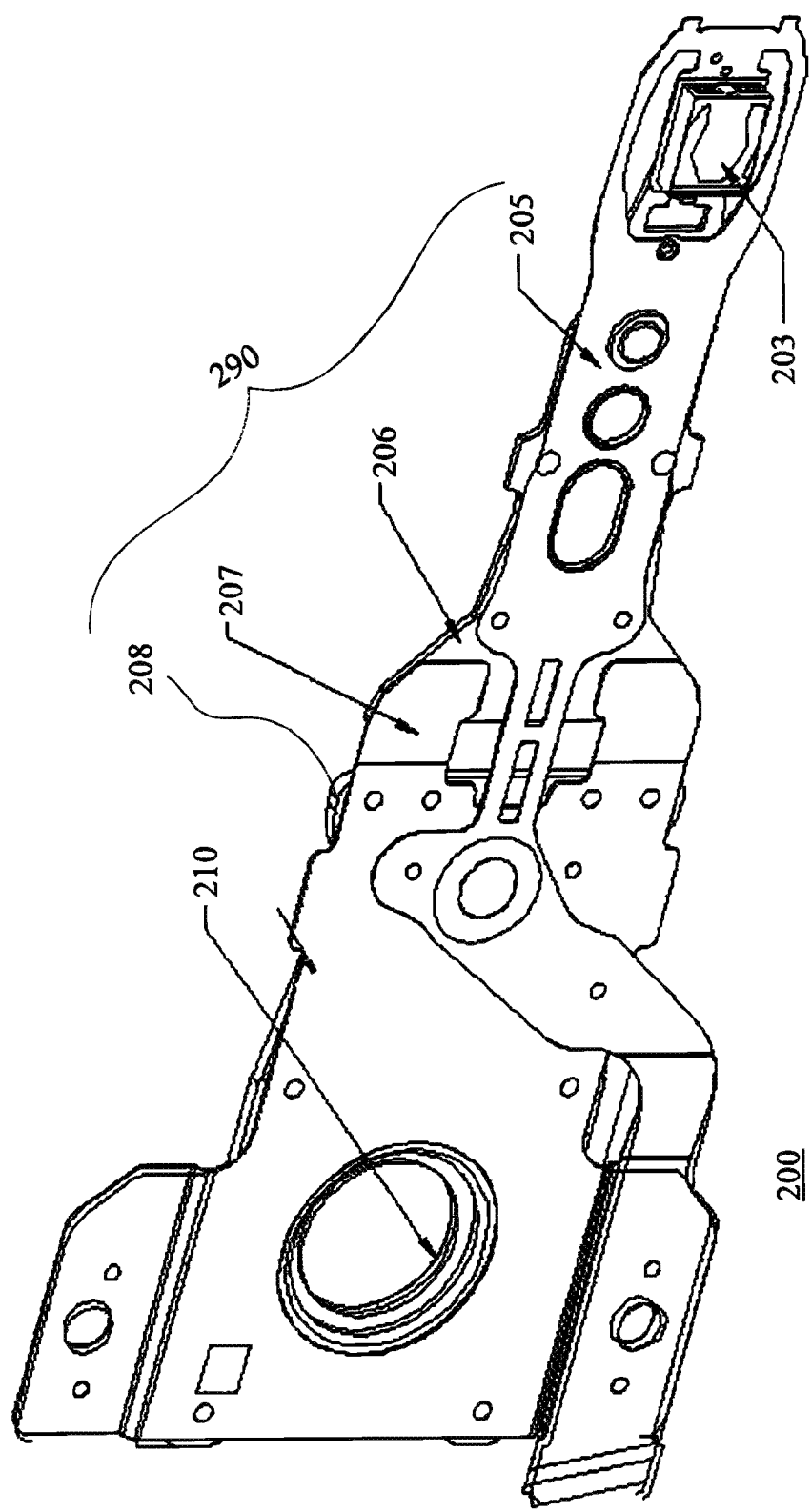
FIG. 3 is a perspective view of a HGA incorporating a suspension of the invention.

Referring to FIG. 2a and FIG. 3, the load beam 206 is used to transfer load forces to the flexure 205 and a slider 203 mounted on the flexure 205. Any suitable rigid material such as stainless steel may be used to form the load beam 206 such that the load beam 206 has sufficient stiffness to transfer the load forces to the flexure 205. The load beam 206 is connected to the base plate 208 by the hinge 207. A locating hole 212 is formed on the load beam 206 for aligning itself with the flexure 205. A dimple 211 is formed on the load beam 206 to support the flexure 205 at a position corresponding to a center of the slider 203. By this engagement of the dimple 211 with the flexure 205, the load forces can be transferred to the slider 203 uniformly.

The base plate 208 is used to enhance structure stiffness of the whole suspension 290 and may be made of rigid material such as stainless steel. A mounting hole 213 is formed on one end of the base plate 208 for mounting the whole suspension 290 to a motor arm of a disk drive.

The hinge 207 has a mounting hole 210 formed on its one end corresponding to the mounting hole 213 of the base plate 208, and the hinge 207 is partially mounted to the base plate 208 with the mounting holes 210, 213 aligned with each other. The hinge 207 and the base plate 208 may be mounted together by laser welding at a plurality of pinpoints distributed on the hinge 207. In addition, two hinge steps 215 may be integrally formed at two sides of the hinge 207 at one end adjacent the mounting hole 210 for strengthening stiffness of the hinge 207. Two hinge struts 214 are extended from the other end of the hinge 207 to partially mount the hinge 207 to the load beam 206.

The flexure 205 is made of flexible material and runs from the hinge 207 to the load beam 206. The flexure 205 has a proximal end 219 adjacent to the hinge 207 and a distal end 218 adjacent to the load beam 206. A locating hole 217 is formed on the distal end 218 of the flexure 205 and is aligned with the locating hole 212 of the load beam 206. The perfect alignment between the locating holes 217 and 212 can assure a high assembly precision between the flexure 205 and the load beam 206. A suspension tongue 216 is provided at the distal end 218 of the flexure 205 to support the slider 203 thereon.

Now referring to FIG. 2b, a more detailed structure of the suspension tongue 216 is shown. As illustrated, the suspension tongue 216 has a leading portion 223 provided at one end thereof and a trailing portion 224 provided at the other end thereof for stably holding the slider 203 on the suspension tongue 216. Several trailing pads 226, such as four, are deposited on the trailing portion 224 of the suspension tongue 216 to couple to a trailing edge of the slider 203 electrically, and a pair of leading pads 225, namely grounding pads, is provided on the leading portion 223 of the suspension tongue 216 to bond to a leading edge of the slider 203 to prevent ESD (electric static discharge) problem. The trailing portion 224 is isolated from other portions of the suspension tongue 216 by a first slot 228. Since the trailing portion 224 is isolated by the first slot 228 and does not connect with other portions of the suspension tongue 216, the expansion and contraction of the suspension tongue 216 caused by strong temperature change will have no impact on the trailing portion 224, thus it can reduce the thermal crown change of the slider 203 and, in turn, reduce the variation of flying height of a slider 203 to improve flying performance of the slider 203 and yield lower shock stresses at the trailing pads 226, so the slider 203 is able to fly more stably.

A pair of F-shaped leading pad notches 231 are formed transversely on the suspension tongue 216 adjacent to the leading portion 223 and symmetrical about a longitudinal centerline of the suspension tongue 216. The vertical ends of the F-shaped leading pad notches 231 are parallel to the longitudinal centerline of the suspension tongue 216 and respectively opened from the perimeter of the suspension tongue 216, and two transverse ends of the F-shaped leading pad notches 231 are closed. The openings of the F-shaped leading pad notches 231, which are defined by the vertical ends and the transverse ends, are facing the free end 227 of the suspension tongue 216. And a pair of leading pads 225 are located at the position between the two transverse ends of the corresponding F-shaped leading pad notches 231 and are semi-surrounded by the corresponding leading pad notches 231, respectively.

Furthermore, a C-shaped closed slot 233 with its opening facing to the trailing portion 224 is formed on the suspension tongue 216 at the position between the first slot 228 and the leading pad notches 231, closer to the latter 231. Furthermore, a closed slot 232 is provided on the suspension tongue 216 at a position adjacent to the first slot 228. Between the C-shaped closed slot 233 and the closed slot 232, a pair of one-end-opened slots 234 are opened from the perimeter of the suspension tongue 216 and extend in a direction transverse or perpendicular to the longitudinal centerline of the suspension tongue 216. The pair of one-end-opened slots 234 are symmetrical about the longitudinal centerline of the suspension tongue 216.

With the introduction of the leading pad notches 231 and the C-shaped closed slot 233 adjacent to the leading pad notches 231, the thermal crown change of the slider 203 under different temperatures is reduced so that the variation of flying height of the slider 203 decreases too, thus improving flying performance of the slider 203, and yielding lower shock stresses at the leading pads 225 and, in turn, the shock performance is improved.

Some parameters, such as the thermal crown change of a slider mounted on a prior art suspension compared to that of a slider mounted on the suspension of the invention and shock stress at the bonding pads and the grounding pads of a prior art embodiment compared to that at the bonding pads and grounding pads of the invention are simulated and tested by certain equipment. The modeling results are tabulated as follows:

| Item | Thermal Crown Change | | Shock Stress | |
| --- | --- | --- | --- | --- |
| | 5-25 deg. C. | 25-55 deg. C. | TE Pads | LE Pads |
| Prior | 2.65 | −3.95 | 20.5 | 29.1 |
| Invention | 1.07 | −1.6 | 14.0 | 22.9 |
| Improvement | 60% | 59% | 32% | 21% |

It can be seen from the table above that the suspension of the present invention yields small thermal crown change of slider under different temperatures and small shock stresses at the trailing pads and the leading pads, so the flying performance and shock performance of the slider can be improved dramatically.

Now, referring to FIG. 3, a HGA 200 according to an embodiment of the invention comprises a suspension 290 and a slider 203 carried on the suspension 290. The suspension 290 comprises a load beam 206, a base plate 208, a hinge 207 and a flexure 205, all of which are assembled with each other. The hinge 207 has a mounting hole 210 formed thereon to assemble the hinge 207 to the base plate 208. And then the slider 203 is carried on the flexure 205.

Figure 4:
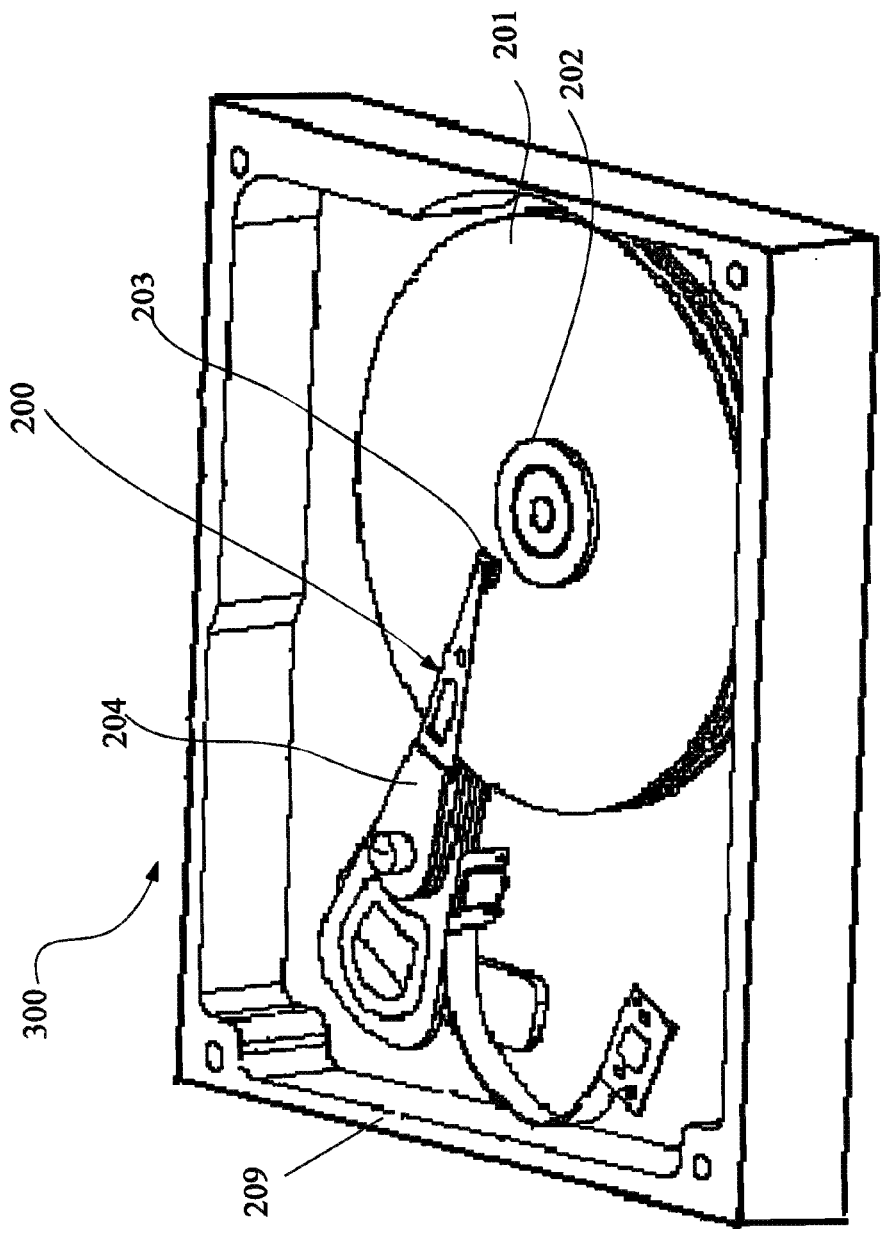
FIG. 4 shows a perspective view of disk drive unit according to an embodiment of the invention.

FIG. 4 shows a disk drive unit according to an embodiment of the invention. The disk drive unit 300 comprises a HGA 200, a drive arm 204 and a slider 203 connected to the HGA 200, a disk 201, and a spindle motor 202 to spin the disk 201, all of which are mounted in a housing 209. Because the structure and/or assembly process of disk drive unit of the present invention are well known to persons ordinarily skilled in the art, a detailed description of such structure and assembly is omitted herefrom.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A suspension for a head gimbal assembly, comprising:
   a flexure having a suspension tongue with a trailing portion, the trailing portion having a plurality of trailing pads formed thereon adapted for bonding to a trailing edge of a slider;
   wherein the trailing portion is isolated from other portions of the flexure by a first slot surrounding the trailing portion; and
   wherein the suspension tongue further comprises a leading portion with a pair of leading pads formed thereon adapted for bonding to a leading edge of the slider and a pair of leading pad notches semi-surrounding the corresponding leading pads respectively.

2. The suspension according to claim 1, wherein each of the leading pad notch is F-shaped, each of the leading pad is located at the position between the two transverse ends of the corresponding F-shaped leading pad notch.

3. The suspension according to claim 1, wherein the pair of leading pad notches are symmetrical about a longitudinal centerline of the suspension tongue.

4. The suspension according to claim 1, wherein the suspension tongue further comprises a C-shaped slot formed adjacent to the leading pad notches and between the first slot and the leading pad notches.

5. The suspension according to claim 4, wherein the suspension tongue further comprises a closed slot formed adjacent to the first slot.

6. The suspension according to claim 5, wherein the suspension tongue further comprises a pair of one-end-opened slots opened from the perimeter of the suspension tongue, the pair of one-end-opened slots are formed between the C-shaped slot and the closed slot adjacent to the first slot and symmetrical about the longitudinal centerline of the suspension tongue.

7. A head gimbal assembly, comprising:
   a suspension comprising a flexure having a suspension tongue with a trailing portion, the trailing portion having a plurality of trailing pads formed thereon; and
   a slider with a trailing edge bonded to the trailing pads;
   wherein the trailing portion is isolated from other portions of the flexure by a first slot surrounding the trailing portion; and
   wherein the suspension tongue further comprises a leading portion with a pair of leading pads formed thereon and a pair of leading pad notches semi-surrounding the corresponding leading pads respectively, the leading pads are bonded to a leading edge of the slider.

8. The head gimbal assembly according to claim 7, wherein each of the leading pad notch is F-shaped, and each of the leading pad is located at the position between the two transverses of the corresponding F-shaped leading pad notch.

9. The head gimbal assembly according to claim 7, wherein the pair of leading pads notches are symmetrical about a longitudinal centerline of the suspension tongue.

10. The head gimbal assembly according to claim 7, wherein the suspension tongue further comprises a C-shaped slot formed adjacent to the leading pad notches and between the first slot and the leading pad notches.

11. The head gimbal assembly according to claim 10, wherein the suspension tongue further comprises a closed slot formed adjacent to the first slot.

12. The head gimbal assembly according to claim 11, wherein the suspension tongue further comprises a pair of one-end-opened slots opened from the perimeter of the suspension tongue, the pair of one-end-opened slots are formed between the C-shaped slot and the closed slot adjacent to the first slot and symmetrical about the longitudinal centerline of the suspension tongue.

13. A disk drive unit, comprising:
a head gimbal assembly including a slider and a suspension that supports the slider;
a drive arm connected to the head gimbal assembly;
a disk; and
a spindle motor operable to spin the disk;
the suspension comprising:
a flexure having a suspension tongue with a trailing portion, the trailing portion having a plurality of trailing pads formed thereon, the trailing pads bonding to a trailing edge of the slider;
wherein the trailing portion is isolated from other portions of the flexure by a first slot surrounding the trailing portion; and
wherein the suspension tongue further comprises a leading portion with a pair of leading pads formed thereon and a pair of leading pad notches semi-surrounding the corresponding leading pads respectively, the leading pads bonded to a leading edge of the slider.

14. The disk drive unit according to claim 13, wherein each of the leading pad notches is F-shaped, and each of the leading pads is located at the position between the two transverse ends of the corresponding F-shaped leading pad notch.

15. The disk drive unit according to claim 13, wherein the pair of leading pads notches are symmetrical about a longitudinal centerline of the suspension tongue.

16. The disk drive unit according to claim 13, wherein the suspension tongue further comprises a C-shaped slot formed adjacent to the leading pad notches and between the first slot and the leading pad notches.

17. The disk drive unit according to claim 13, wherein the suspension tongue further comprises a pair of one-end-opened slots opened from the perimeter of the suspension tongue, the pair of one-end-opened slots are formed between the C-shaped slot and the first slot and symmetrical about the longitudinal centerline of the suspension tongue.

* * * * *